US012516180B2

(12) United States Patent
Belin et al.

(10) Patent No.: US 12,516,180 B2
(45) Date of Patent: Jan. 6, 2026

(54) RUBBER COMPOSITION BASED ON EPOXY RESIN AND AN AMINOBENZOATE DERIVATIVE

(71) Applicant: COMPAGNIE GENERALE DES ETABLISSEMENTS MICHELIN, Clermont-Ferrand (FR)

(72) Inventors: Lionel Belin, Clermont-Ferrand (FR); Fabien Bonnette, Clermont-Ferrand (FR); Emmanuel Landreau, Clermont-Ferrand (FR); Philippe Laubry, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 827 days.

(21) Appl. No.: 17/257,178

(22) PCT Filed: Jun. 28, 2019

(86) PCT No.: PCT/FR2019/051608
§ 371 (c)(1),
(2) Date: Dec. 30, 2020

(87) PCT Pub. No.: WO2020/008130
PCT Pub. Date: Jan. 9, 2020

(65) Prior Publication Data
US 2021/0179819 A1 Jun. 17, 2021

(30) Foreign Application Priority Data
Jul. 2, 2018 (FR) ...................... 1856074

(51) Int. Cl.
C08L 7/00 (2006.01)
B60C 1/00 (2006.01)
C08K 3/04 (2006.01)
C08K 3/06 (2006.01)
C08K 3/22 (2006.01)
C08K 5/18 (2006.01)
C08L 63/04 (2006.01)

(52) U.S. Cl.
CPC ................... C08L 7/00 (2013.01); B60C 1/00 (2013.01); C08K 3/04 (2013.01); C08K 3/06 (2013.01); C08K 3/22 (2013.01); C08K 5/18 (2013.01); C08L 63/04 (2013.01); C08K 2003/2296 (2013.01); C08L 2312/00 (2013.01)

(58) Field of Classification Search
CPC ........ C08L 7/00; C08L 63/04; C08L 2312/00; B60C 1/00; C08K 3/04; C08K 3/06; C08K 3/22; C08K 5/18; C08K 2003/2296; C08K 3/34; C08K 5/101; C08K 3/013
See application file for complete search history.

(56) References Cited

U.S. PATENT DOCUMENTS

| | | |
|---|---|---|
| 4,562,217 A | 12/1985 | Hirschbuehler |
| 6,610,261 B1 | 8/2003 | Custodero et al. |
| 6,747,087 B2 | 6/2004 | Custodero et al. |
| 6,774,255 B1 | 8/2004 | Tardivat et al. |
| 7,199,175 B2 | 4/2007 | Vasseur |
| 7,217,751 B2 | 5/2007 | Durel et al. |
| 7,250,463 B2 | 7/2007 | Durel et al. |
| 7,488,768 B2 | 2/2009 | Tardivat et al. |
| 7,820,771 B2 | 10/2010 | Lapra et al. |
| 7,900,667 B2 | 3/2011 | Vasseur |
| 8,461,269 B2 | 6/2013 | Varagniat et al. |
| 8,492,475 B2 | 7/2013 | Araujo Da Silva et al. |
| 8,877,839 B2 | 11/2014 | Veyland et al. |
| 8,883,929 B2 | 11/2014 | Gandon-Pain et al. |
| 8,957,155 B2 | 2/2015 | Seeboth et al. |
| 9,010,393 B2 | 4/2015 | Araujo Da Silva et al. |
| 2003/0212185 A1 | 11/2003 | Vasseur |
| 2004/0051210 A1 | 3/2004 | Tardivat et al. |
| 2004/0132880 A1 | 7/2004 | Durel et al. |
| 2005/0004297 A1 | 1/2005 | Durel et al. |
| 2007/0112120 A1 | 5/2007 | Vasseur |
| 2008/0132644 A1 | 6/2008 | Lapra et al. |
| 2009/0186961 A1 | 7/2009 | Araujo Da Silva et al. |
| 2009/0209709 A1 | 8/2009 | Araujo Da Silva et al. |
| 2009/0234066 A1 | 9/2009 | Araujo Da Silva et al. |
| 2009/0270558 A1 | 10/2009 | Gandon-pain et al. |
| 2010/0022714 A1 | 1/2010 | Varagniat et al. |
| 2010/0145089 A1 | 6/2010 | Mignani et al. |
| 2011/0021702 A1 | 1/2011 | Gandon-Pain et al. |
| 2011/0152458 A1 | 6/2011 | Araujo Da Silva et al. |
| 2011/0294953 A1 | 12/2011 | Seeboth et al. |

(Continued)

FOREIGN PATENT DOCUMENTS

| | | |
|---|---|---|
| EP | 0133281 A2 | 2/1985 |
| EP | 0649446 A1 | 4/1995 |

(Continued)

OTHER PUBLICATIONS

S. Brunauer, et al., "Adsorption of Gases in Multimolecular Layers", J. Am. Chem. Soc., vol. 60, pp. 309-319 (1938).

B.S. Rao, et al., "Synthesis and characterization of difunctional benzoxazines from aromatic diester diamine containing varying length of aliphatic spacer group: Polymerization, thermal and viscoelastic characteristics", Euro. Polymer. J. 77 (2016) 139-154.

M.S.U. Khan, et al., "Synthesis, characterization and morphological studies of some novel siloxane-based block copolymer materials containing organometallic as well as organic polyesteramides", J. Organometallic Chem. 745-746 (2013) 312-328.

International Search Report dated Oct. 14, 2019, in corresponding PCT/FR2019/051608 (4 pages).

Primary Examiner — Doris L Lee
(74) Attorney, Agent, or Firm — VENABLE LLP

(57) ABSTRACT

A rubber composition exhibiting an improved processability/stiffness compromise is based on at least one diene elastomer, a reinforcing filler, a crosslinking system, from 1 to 30 phr of an epoxy resin, and from 0.5 to 15 phr of a specific aminobenzoate derivative.

14 Claims, No Drawings

(56) References Cited

U.S. PATENT DOCUMENTS

| | | | |
|---|---|---|---|
| 2012/0208948 A1 | 8/2012 | Gandon-Pain et al. | |
| 2012/0283360 A1* | 11/2012 | Veyland | C08L 9/00 |
| | | | 523/467 |
| 2014/0142199 A1 | 5/2014 | Bezwada | |
| 2014/0309334 A1* | 10/2014 | Kramer | C08G 59/504 |
| | | | 523/400 |
| 2019/0241722 A1 | 8/2019 | Landreau et al. | |

FOREIGN PATENT DOCUMENTS

| | | | |
|---|---|---|---|
| FR | 2951182 A1 | | 4/2011 |
| GB | 2510835 A | * | 8/2014 |
| WO | 97/36724 A2 | | 10/1997 |
| WO | 99/09036 A1 | | 2/1999 |
| WO | 99/16600 A1 | | 4/1999 |
| WO | 01/93823 A1 | | 12/2001 |
| WO | 02/10269 A2 | | 2/2002 |
| WO | 02/30939 A1 | | 4/2002 |
| WO | 02/31041 A1 | | 4/2002 |
| WO | 02/083782 A1 | | 10/2002 |
| WO | 03/16387 A1 | | 2/2003 |
| WO | 2006/023815 A2 | | 3/2006 |
| WO | 2006/069792 A1 | | 7/2006 |
| WO | 2006/069793 A1 | | 7/2006 |
| WO | 2006/125532 A1 | | 11/2006 |
| WO | 2006/125533 A1 | | 11/2006 |
| WO | 2006/125534 A1 | | 11/2006 |
| WO | 2007/061550 A1 | | 5/2007 |
| WO | 2007/098080 A2 | | 8/2007 |
| WO | 2008/003434 A1 | | 1/2008 |
| WO | 2008/003435 A1 | | 1/2008 |
| WO | 2008/055986 A2 | | 5/2008 |
| WO | 2010/072685 A1 | | 7/2010 |
| WO | 2011/045342 A1 | | 4/2011 |
| WO | 2014/095588 A1 | | 4/2014 |
| WO | 2018/002538 A1 | | 1/2018 |

* cited by examiner

RUBBER COMPOSITION BASED ON EPOXY RESIN AND AN AMINOBENZOATE DERIVATIVE

FIELD OF THE INVENTION

The present invention relates to rubber compositions intended in particular for the manufacture of tyres or of semi-finished products for tyres. A subject of the present invention is also a finished or semi-finished rubber article comprising a rubber composition according to the invention, and also a tyre comprising at least one composition according to the invention.

PRIOR ART

It is known practice to use, in some parts of tyres, rubber compositions exhibiting a high stiffness during small strains of the tyre, as presented in Application WO 02/10269. Resistance to small strains is one of the properties which a tyre has to exhibit in order to respond to the stresses to which it is subjected.

This stiffening can be obtained by increasing the content of reinforcing filler or by incorporating certain reinforcing resins in the constituent rubber compositions of the parts of the tyre.

The reinforcing resins conventionally used to increase the stiffness of the compositions are reinforcing resins based on a methylene acceptor/donor system. The terms "methylene acceptor" and "methylene donor" are well known to those skilled in the art and are widely used to denote compounds capable of reacting together to generate, by condensation, a three-dimensional reinforcing resin which will become superimposed and interpenetrated with the reinforcing filler/elastomer network, on the one hand, and with the elastomer/sulfur network, on the other hand (if the crosslinking agent is sulfur). The methylene acceptor described above is combined with a hardener, capable of crosslinking or hardening it, also commonly known as "methylene donor". Crosslinking of the resin is then brought about, during the curing of the rubber matrix, by formation of methylene bridges between the carbons in the ortho and para positions of the phenolic nuclei of the resin and the methylene donor, thus creating a three-dimensional resin network.

Conventionally, the methylene acceptor is a phenolic resin. Phenolic novolac resins have already been described in rubber compositions, intended in particular for tyres or tyre treads, for applications as varied as adhesion or reinforcement: reference will be made, for example, to Patent EP 0 649 446. Furthermore, the methylene donors conventionally used are hexamethylenetetramine (abbreviated to HMT) or hexamethoxymethylmelamine (abbreviated to HMMM or H3M) or hexaethoxymethylmelamine.

However, the combination of a phenolic resin, methylene acceptor, with HMT or H3M, methylene donor, produces formaldehyde during the vulcanization of the rubber composition. In point of fact, it is desirable to reduce, indeed even to eliminate, in the long run, formaldehyde from rubber compositions due to the potential environmental impact of these compounds.

To this end, alternative compositions to the conventional compositions comprising the formaldehyde/phenol resin pair, methylene acceptor, with an HMT or H3M hardener, methylene donor, have been developed. By way of example, Application WO 2011/045342 describes compositions comprising an epoxy resin pair with an amine-comprising hardener. These compositions, in addition to the advantage of being freed from the formation of formaldehyde, exhibit, after crosslinking, greater stiffnesses than conventional compositions while retaining an acceptable rolling resistance. Application WO 2018/002538 describes compositions comprising an epoxy resin and an amine-comprising hardener which aims to improve the processability (in particular the scorch time)/stiffness compromise compared to known compositions.

However, it is still desirable to improve the properties in the raw state of these compositions, in particular their processability, so as to facilitate their production and to thus reduce the overall production costs, while maintaining a good level of stiffness of the compositions.

Unexpectedly, the applicant has discovered, during its research studies, that the combination of a particular aminobenzoate derivative with an epoxy resin makes it possible to improve the processability of the rubber compositions before curing (in the raw state), in particular the scorch time or the viscosity of these compositions, relative to the compositions used to date, while at the same time maintaining or even improving the stiffness properties in the cured state. Thus, the compositions in accordance with the present invention exhibit a processability/stiffness compromise which is far superior to that of the known compositions.

Definitions

For the purposes of the present invention, the expression "part by weight per hundred parts by weight of elastomer" (or phr) should be understood as meaning the part by weight per hundred parts by weight of elastomer or rubber.

In the present document, unless expressly indicated otherwise, all the percentages (%) indicated are percentages (%) by weight.

Moreover, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b). In the present document, when an interval of values is described by the expression "from a to b", the interval represented by the expression "between a and b" is also and preferably described.

The expression "composition based on" should be understood as meaning a composition comprising the mixture and/or the product of the in situ reaction of the various constituents used, some of these constituents being able to react and/or being intended to react with one another, at least partially, during the various phases of manufacture of the composition; it thus being possible for the composition to be in the completely or partially crosslinked state or in the noncrosslinked state.

When reference is made to a "predominant" compound, this is understood to mean, for the purposes of the present invention, that this compound is predominant among the compounds of the same type in the composition, that is to say that it is the one which represents the greatest amount by weight among the compounds of the same type. Thus, for example, a predominant elastomer is the elastomer representing the greatest weight with respect to the total weight of the elastomers in the composition. In the same way, a "predominant" filler is that representing the greatest weight among the fillers of the composition. By way of example, in a system comprising just one elastomer, the latter is predominant for the purposes of the present invention and, in a system comprising two elastomers, the predominant elastomer represents more than half of the weight of the elastomers. On the contrary, a "minor" compound is a compound which does not represent the greatest fraction by weight among the compounds of the same type. Preferably, the term "predominant" is understood to mean present at more than 50%, preferably more than 60%, 70%, 80%, 90%, and more preferentially the "predominant" compound represents 100%.

The compounds comprising carbon mentioned in the description can be of fossil origin or biosourced. In the latter case, they can result, partially or completely, from biomass or be obtained from renewable starting materials resulting from biomass. Polymers, plasticizers, fillers, and the like, are concerned in particular.

DESCRIPTION OF THE INVENTION

The invention relates to at least one of the following embodiments:
1. Rubber composition based on at least:
a diene elastomer,
a reinforcing filler,
a crosslinking system,
from 1 to 30 parts by weight, per hundred parts by weight of elastomer, phr, of an epoxy resin, and
from 0.5 to 15 phr of an aminobenzoate derivative corresponding to formula (I):

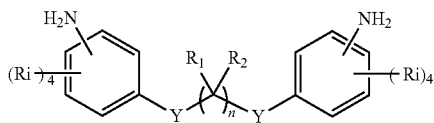

(I)

in which:
n represents an integer ranging from 1 to 5,
Y represents an ester function,
$R_1$ and $R_2$, which may be identical or different, are selected from the group consisting of a hydrogen atom and a methyl, ethyl, propyl, butyl, isopropyl, isobutyl, tert-butyl or benzyl group,
the Ri groups, which may be identical or different, are selected from the group consisting of a hydrogen atom and linear or branched $C_1$-$C_6$ alkyl radicals.
2. Rubber composition according to embodiment 1, in which the aminobenzoate derivative corresponds to formula (II) or (III):

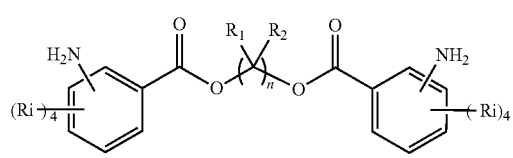

(II)

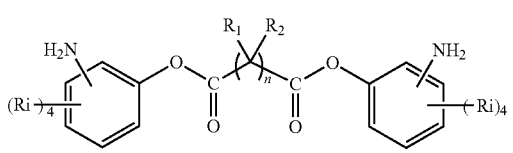

(III)

3. Rubber composition according to embodiment 1, in which the aminobenzoate derivative corresponds to formula (IV):

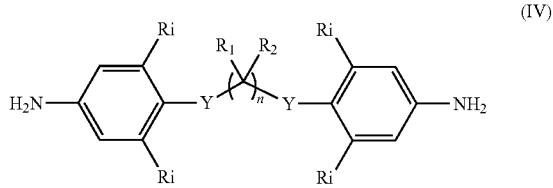

(IV)

4. Rubber composition according to any one of embodiments 1 to 3, in which the aminobenzoate derivative corresponds to formula (V) or (VI):

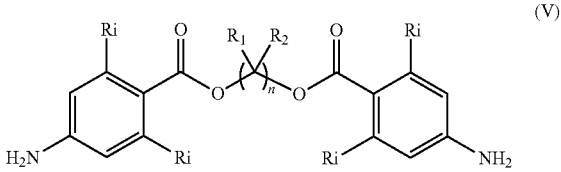

(V)

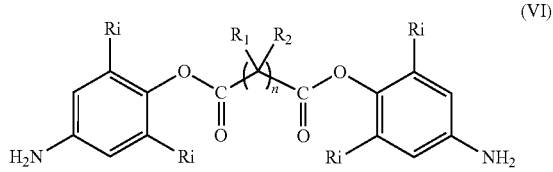

(VI)

5. Rubber composition according to any one of embodiments 1 to 4, in which the linear or branched $C_1$-$C_6$ alkyl radicals of the Ri groups are, independently of one another, selected from the group consisting of methyl, ethyl, propyl, isopropyl, isobutyl and butyl radicals, preferably from the group consisting of methyl and ethyl radicals.
6. Rubber composition according to any one of embodiments 1 to 4, in which all of the Ri groups are hydrogen atoms.
7. Rubber composition according to any one of embodiments 1 to 6, in which n represents an integer ranging from 2 to 4.
8. Rubber composition according to any one of embodiments 1 to 7, in which $R_1$ and $R_2$, which may be identical or different, are selected from the group consisting of a hydrogen atom and a methyl or ethyl group.
9. Rubber composition according to any one of embodiments 1 to 8, in which $R_1$ and $R_2$ are hydrogen atoms.
10. Rubber composition according to embodiment 1, in which the aminobenzoate derivative is selected from the group consisting of trimethylene bis(4-aminobenzoate); 3,3-dimethyl-1,5-pentanediol 1,5-bis(4-aminobenzoate); 2-ethyl-1,3-hexanediol 1,3-bis(4-aminobenzoate); 1,3-butanediol 1,3-bis(4-aminobenzoate); 2-methyl-1,3-propanediol 1,3-bis(4-aminobenzoate); 2,2-diethyl-1,3-propanediol 1,3-bis(4-aminobenzoate); 2,4-pentanediol 2,4-bis(4-aminobenzoate); 1,2-propanediol 1,2-bis(4-aminobenzoate); 1,4-butanediol 1,4-bis(4-aminobenzoate); 2,2-dimethyl-1,3-propanediol 1,3-bis(4-aminobenzoate); 1,2-ethanediol 1,2-bis(4-aminobenzoate) and mixtures thereof.
11. Rubber composition according to embodiment 10, in which the aminobenzoate derivative is selected from the group consisting of trimethylene bis(4-aminobenzoate); 1,4- butanediol 1,4-bis(4-aminobenzoate); 1,2-ethanediol 1,2-bis (4-aminobenzoate), and mixtures thereof.

12. Rubber composition according to any one of embodiments 1 to 11, in which the aminobenzoate derivative content is within a range extending from 1 to 10 phr, preferably from 2 to 8 phr.

13. Rubber composition according to any one of embodiments 1 to 12, in which the elastomer is selected from the group consisting of natural rubber, synthetic polyisoprenes, polybutadienes, butadiene copolymers, isoprene copolymers and the mixtures of these elastomers.

14. Rubber composition according to any one of embodiments 1 to 13, in which the epoxy resin is selected from aromatic epoxy, alicyclic epoxy and aliphatic epoxy resins.

15. Rubber composition according to embodiment 14, in which the epoxy resin is selected from epoxy cresol novolac resins.

16. Rubber composition according to any one of embodiments 1 to 13, in which the epoxy resin is selected from the group consisting of 2,2-bis[4-(glycidyloxy)phenyl]propane, poly[(o-cresyl glycidyl ether)-co-formaldehyde], poly[(phenyl glycidyl ether)-co-formaldehyde], poly[(phenyl glycidyl ether)-co-(hydroxybenzaldehyde glycidyl ether)] and the mixtures of these compounds.

17. Rubber composition according to any one of embodiments 1 to 16, in which the content of epoxy resin is between 10 and 25 phr, preferably between 15 and 20 phr.

18. Rubber composition according to any one of the preceding embodiments, in which the reinforcing filler comprises carbon black, a reinforcing inorganic filler or a mixture of carbon black and of reinforcing inorganic filler; preferably, the reinforcing filler predominantly comprises carbon black.

19. Rubber composition according to any one of the preceding embodiments, in which the content of reinforcing filler is within a range extending from 20 to 200 phr, preferably from 30 to 150 phr.

20. Finished or semi-finished rubber article comprising a rubber composition according to any one of the preceding embodiments.

21. Tyre comprising a rubber composition according to any one of embodiments 1 to 19 or a semi-finished rubber article according to embodiment 20.

22. Tyre according to embodiment 21, in which the rubber composition according to any one of embodiments 1 to 19 is present in at least one internal layer.

23. Tyre according to embodiment 22, in which the internal layer is selected from the group consisting of carcass plies, crown plies, bead-wire fillings, crown feet, decoupling layers, edge rubbers, padding rubbers, the tread underlayer and the combinations of these internal layers.

Diene Elastomer

The composition according to the invention comprises at least one diene elastomer. It may therefore contain just one diene elastomer or a mixture of several diene elastomers.

A "diene" elastomer (or, without distinction, rubber), whether natural or synthetic, should be understood, in a known way, as meaning an elastomer composed, at least in part (i.e., a homopolymer or a copolymer), of diene monomer units (monomers bearing two conjugated or non-conjugated carbon-carbon double bonds).

These diene elastomers can be classified into two categories: "essentially unsaturated" or "essentially saturated". "Essentially unsaturated" is generally understood to mean a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content, always less than 15%, of units of diene origin). The diene elastomers included in the composition according to the invention are preferentially essentially unsaturated.

"Diene elastomer capable of being used in the compositions in accordance with the invention" is understood particularly to mean:
(a) any homopolymer of a conjugated or non-conjugated diene monomer having from 4 to 18 carbon atoms;
(b) any copolymer of a conjugated or non-conjugated diene having from 4 to 18 carbon atoms and of at least one other monomer.

The other monomer can be ethylene, an olefin or a conjugated or non-conjugated diene.

Suitable as conjugated dienes are conjugated dienes having from 4 to 12 carbon atoms, especially 1,3-dienes, such as, in particular, 1,3-butadiene and isoprene.

Suitable as olefins are vinylaromatic compounds having from 8 to 20 carbon atoms and aliphatic α-monoolefins having from 3 to 12 carbon atoms.

Suitable as vinylaromatic compounds are, for example, styrene, ortho-, meta- or para-methylstyrene, the "vinyltoluene" commercial mixture or para-(tert-butyl)styrene.

Suitable as aliphatic α-monoolefins are in particular acyclic aliphatic α-monoolefins having from 3 to 18 carbon atoms.

Preferentially, the diene elastomer is selected from the group consisting of polybutadienes (BRs), natural rubber (NR), synthetic polyisoprenes (IRs), butadiene copolymers, isoprene copolymers and the mixtures of these elastomers. The butadiene copolymers are particularly selected from the group consisting of butadiene/styrene copolymers (SBRs).

Preferably, the diene elastomer is an isoprene elastomer.

"Isoprene elastomer" is understood to mean, in a known way, an isoprene homopolymer or copolymer, in other words a diene elastomer selected from the group consisting of natural rubber (NR), synthetic polyisoprenes (IRs), various isoprene copolymers and the mixtures of these elastomers. Mention will in particular be made, among isoprene copolymers, of isobutene/isoprene (butyl rubber—IIR), isoprene/styrene (SIR), isoprene/butadiene (BIR) or isoprene/butadiene/styrene (SBIR) copolymers. This isoprene elastomer is preferably natural rubber or a synthetic cis-1,4-polyisoprene; use is preferably made, among these synthetic polyisoprenes, of polyisoprenes having a content (mol %) of cis-1,4-bonds of greater than 90%, more preferentially still of greater than 98%.

Preferentially, the content of diene elastomer, preferably of isoprene elastomer, preferably natural rubber, is from 50 to 100 phr, more preferentially from 60 to 100 phr, in a more preferential way from 70 to 100 phr, more preferentially still from 80 to 100 phr and very preferentially from 90 to 100 phr. In particular, the content of diene elastomer, preferably of isoprene elastomer, preferably again of natural rubber, is very preferentially 100 phr.

Whether it contains just one diene elastomer or a mixture of several diene elastomers, the rubber composition according to the invention can also contain, in a minor way, any type of synthetic elastomer other than a diene elastomer, indeed even polymers other than elastomers, for example thermoplastic polymers. Preferably, the rubber composition according to the invention does not contain a synthetic elastomer other than a diene elastomer or a polymer other than elastomers or contains less than 10 phr, preferably less than 5 phr, thereof.

Epoxy Resin

The composition according to the invention comprises between 1 and 30 phr of an epoxy resin.

The epoxy resins which can be used in the present invention include all the polyepoxide compounds. They can concern, for example, aromatic epoxy, alicyclic epoxy and aliphatic epoxy resins. For example, the aromatic epoxy resin can be an amine-aromatic epoxy resin. These resins are preferably epoxy novolac resins, that is to say epoxy resins obtained by acid catalysis, in contrast to resol resins, which are obtained by basic catalysis. Preferably, these resins are epoxy cresol novolac resins.

In particular among aromatic epoxy compounds, preference is given to epoxy resins selected from the group consisting of 2,2-bis [4-(glycidyloxy)phenyl]propane, poly[(o-cresyl glycidyl ether)-co-formaldehyde], poly[(phenyl glycidyl ether)-co-formaldehyde], poly[(phenyl glycidyl ether)-co-(hydroxybenzaldehyde glycidyl ether)] and the mixtures of these compounds.

Preferably again, the epoxy resin is selected from the group consisting of poly[(o-cresyl glycidyl ether)-co-formaldehyde], poly[(o-phenyl glycidyl ether)-co-formaldehyde], amine aromatic epoxy resins and the mixtures of these compounds.

Mention may be made, as example of commercially available epoxy resins which can be used in the context of the present invention, for example, of the epoxy resin DEN 439 from Uniqema, the epoxy resin tris(4-hydroxyphenyl) methane triglycidyl ether from Sigma-Aldrich or the epoxy cresol novolac resin Araldite ECN 1299 from Huntsman.

The amount of epoxy resin is between 1 and 30 phr. In view of the aminobenzoate derivative used in the context of the present invention, below the minimum content of resin indicated, the targeted technical effect is insufficient whereas, above the maximum indicated, risks arise of an excessively great increase in the stiffness and of excessive damage to the hysteresis and to the Mooney plasticity. For all these reasons, the content of epoxy resin is between 10 and 25 phr. More preferably, the content of epoxy resin in the composition according to the invention is between 15 and 20 phr.

Aminobenzoate Derivative

The rubber composition according to the invention also comprises from 0.5 to 15 phr of an aminobenzoate derivative corresponding to formula (I):

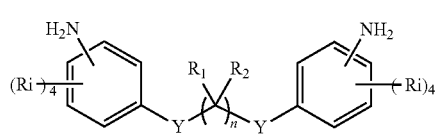

(I)

in which:
n represents an integer ranging from 1 to 5,
Y represents an ester function,
$R_1$ and $R_2$, which may be identical or different, are selected from the group consisting of a hydrogen atom and a methyl, ethyl, propyl, butyl, isopropyl, isobutyl, tert-butyl or benzyl group,
the Ri groups, which may be identical or different, are selected from the group consisting of a hydrogen atom and linear or branched $C_1$-$C_6$ alkyl radicals.

In the context of the present invention, these aminobenzoate derivatives make it possible to crosslink the resin under the appropriate conditions, in particular during curing.

Preferably, the aminobenzoate derivative corresponds to formula (II) or (III):

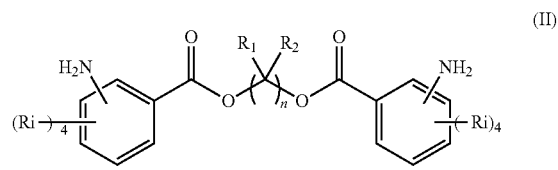

(II)

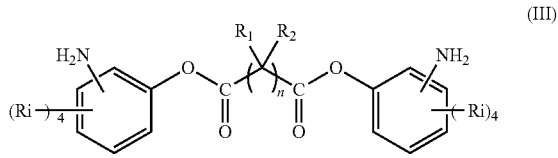

(III)

in which n, $R_1$ and $R_2$ and the Ri groups are as defined above.

Preferably, the aminobenzoate derivative corresponds to formula (II) in which n, $R_1$ and $R_2$ and the Ri groups are as defined above.

Preferably, the aminobenzoate derivative corresponds to one of formulae (I), (II) or (III) in which, for each of the aromatic rings of the aminobenzoate derivative, at least two of the Ri groups located in the ortho or para position with respect to the primary amine function are a hydrogen atom.

The aminobenzoate derivative can correspond to formula (IV):

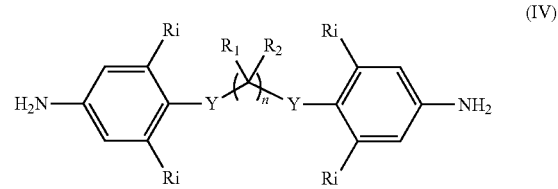

(IV)

in which n, $R_1$ and $R_2$ and the Ri groups are as defined above.

Preferably, the aminobenzoate derivative corresponds to formula (V) or (VI):

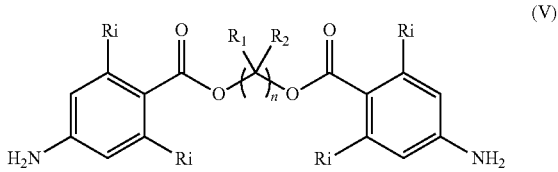

(V)

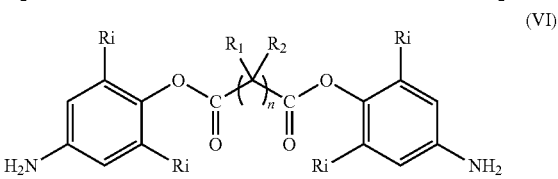

(VI)

in which n, $R_1$ and $R_2$ and the Ri groups are as defined above.

Particularly advantageously, the aminobenzoate derivative corresponds to formula (V) in which n, $R_1$ and $R_2$ and the Ri groups are as defined above.

Whatever the formula (I) to (VI) of the aminobenzoate derivative, the Ri groups, which may be identical or different, are preferentially selected from the group consisting of a hydrogen atom and linear or branched $C_1$-$C_6$ alkyl radicals. The linear or branched $C_1$-$C_6$ alkyl radicals of the Ri groups can, independently of one another, be selected from the group comprising or consisting of methyl, ethyl, propyl, isopropyl, isobutyl and butyl radicals, preferably from the group consisting of methyl and ethyl radicals. More preferably, all the Ri groups are hydrogen atoms.

Whatever the formula (I) to (VI) of the aminobenzoate derivative, n also preferably represents an integer ranging from 2 to 4.

Whatever the formula (I) to (VI) of the aminobenzoate derivative, according to the invention, $R_1$ and $R_2$, which may be identical or different, are preferentially selected from the group comprising or consisting of a hydrogen atom and a methyl, ethyl, isobutyl or benzyl group, more preferably from the group comprising or consisting of a hydrogen atom and a methyl or ethyl group. More preferably, $R_1$ and $R_2$ are hydrogen atoms.

When the aminobenzoate derivative corresponds to formula (I), (II), (IV) or (V), it is advantageously selected from the group comprising or consisting of trimethylene bis(4-aminobenzoate); 3,3-dimethyl-1,5-pentanediol 1,5-bis(4-aminobenzoate); 2-ethyl-1,3-hexanediol 1,3-bis(4-aminobenzoate); 1,3-butanediol 1,3-bis(4-aminobenzoate); 2-methyl-1,3-propanediol 1,3-bis(4-aminobenzoate); 2,2-diethyl-1,3-propanediol 1,3-bis(4-aminobenzoate); 2,4-pentanediol 2,4-bis(4-aminobenzoate); 1,2-propanediol 1,2-bis(4-aminobenzoate); 1,4-butanediol 1,4-bis(4-aminobenzoate); 2,2-dimethyl-1,3-propanediol 1,3-bis(4-aminobenzoate); 1,2-ethanediol 1,2-bis(4-aminobenzoate) and mixtures thereof, preferably selected from the group consisting of trimethylene bis(4-aminobenzoate); 2-ethyl-1,3-hexanediol 1,3-bis(4-aminobenzoate); 1,3-butanediol 1,3-bis(4-aminobenzoate); 2-methyl-1,3-propanediol 1,3-bis(4-aminobenzoate); 2,2-diethyl-1,3-propanediol 1,3-bis(4-aminobenzoate); 2,4-pentanediol 2,4-bis(4-aminobenzoate); 1,2-propanediol 1,2-bis(4-aminobenzoate); 1,4-butanediol 1,4-bis(4-aminobenzoate); 2,2-dimethyl-1,3-propanediol 1,3-bis(4-aminobenzoate); 1,2-ethanediol 1,2-bis(4-aminobenzoate) and mixtures thereof.

When the aminobenzoate derivative corresponds to formula (I), (II), (IV) or (V) and when $R_1$ and $R_2$ are hydrogen atoms, the aminobenzoate derivative is advantageously selected from the group comprising or consisting of trimethylene bis(4-aminobenzoate); 1,4-butanediol 1,4-bis(4-aminobenzoate); 1,2-ethanediol 1,2-bis(4-aminobenzoate) and mixtures thereof. Particularly advantageously, the aminobenzoate derivative is trimethylene bis(4-aminobenzoate).

Moreover, by way of example of compounds corresponding to formulae (III) and (VI), mention may be made of butanedioic acid; 1,4-bis(4-aminophenyl) ester; pentanedioic acid; 1,5-bis(4-aminophenyl) ester; hexanedioic acid and 1,6-bis(4-aminophenyl) ester.

Compounds corresponding to formulae (I) to (VI) are commercially available. For example, trimethylene bis(4-aminobenzoate) which corresponds to formula (VII) below is available under the name Versalink 740 M from Air Product:

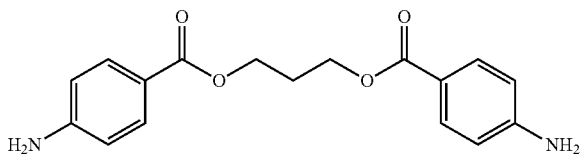

Such compounds can also be obtained according to the protocols described in the documents Rao et al., European Polymer Journal (2016), 77, 139-154; Saif Ullah Khan et al., Journal of Organometallic Chemistry (2013), 745-746, 312-328; or in documents US 2014/0142199 and WO 2001/093823, for example.

According to the invention, the content of aminobenzoate derivative is within a range extending from 0.5 to 15 phr. Below the indicated minimum, the targeted technical effect has been found to be insufficient, while above the indicated maximum, the stiffness is penalized. Preferably, the content of aminobenzoate derivative is within a range extending from 1 to 10 phr, preferably from 2 to 8 phr and more preferably from 3 to 5 phr.

Reinforcing Filler

The composition of the tyre according to the invention advantageously comprises a reinforcing filler.

The reinforcing filler may comprise any type of reinforcing filler known for its ability to reinforce a rubber composition which can be used for the manufacture of tyres, for example an organic filler such as carbon black, a reinforcing inorganic filler such as silica, or a mixture of carbon black and reinforcing inorganic filler. More preferably, the reinforcing filler predominantly, indeed even exclusively, comprises carbon black, in particular in the case where the composition is used in an internal layer. The reinforcing filler can also predominantly comprise a reinforcing inorganic filler, in particular in the case where the composition is used in a tread.

Such a reinforcing filler typically consists of particles, the (weight-)average size of which is less than a micrometre, generally less than 500 nm, most often between 20 and 200 nm, in particular and more preferentially between 20 and 150 nm.

All carbon blacks, notably blacks of the HAF, ISAF or SAF type, conventionally used in tyres ("tyre-grade" blacks) are suitable as carbon blacks. Among the latter, mention will more particularly be made of the reinforcing carbon blacks of the 100, 200 and 300 series (ASTM grades), such as, for example, the N115, N134, N234, N326, N330, N339, N347 and N375 blacks, or else, depending on the applications targeted, the blacks of higher series (for example N660, N683 or N772). The carbon blacks might, for example, be already incorporated in an isoprene elastomer in the form of a masterbatch (see, for example, Applications WO 97/36724 and WO 99/16600). The BET specific surface area of the carbon blacks is measured according to Standard D6556-10 [multipoint (a minimum of 5 points) method—gas:nitrogen—relative pressure P/PO range: 0.1 to 0.3].

Mention may be made, as examples of organic fillers other than carbon blacks, of functionalized polyvinyl organic fillers, such as described in Applications WO-A-2006/069792, WO-A-2006/069793, WO-A-2008/003434 and WO-A-2008/003435.

"Reinforcing inorganic filler" should be understood, in the present patent application, by definition, as meaning any inorganic or mineral filler (whatever its colour and its origin, natural or synthetic), also known as "white filler", "clear filler" or indeed even "non-black filler", in contrast to carbon black, capable of reinforcing by itself alone, without means other than an intermediate coupling agent, a rubber composition intended for the manufacture of tyres, in other words capable of replacing, in its reinforcing role, a conventional tyre-grade carbon black; such a filler is generally characterized, in a known way, by the presence of hydroxyl (—OH) groups at its surface.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to those skilled in the art, in particular any precipitated or fumed silica exhibiting a BET surface area and a CTAB specific surface area both of less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface area such as described in Application WO 03/16837.

The BET specific surface area of the silica is determined in a known way by gas adsorption using the Brunauer-Emmett-Teller method described in "*The Journal of the American Chemical Society*", Vol. 60, page 309, February 1938, more specifically according to French Standard NF ISO 9277 of December 1996 (multipoint (5 point) volumetric method—gas:nitrogen—degassing: 1 hour at 160° C.—relative pressure p/p0 range: 0.05 to 0.17). The CTAB specific surface area of the silica is determined according to French Standard NF T 45-007 of November 1987 (method B).

Mineral fillers of the aluminous type, in particular alumina ($Al_2O_3$) or aluminium (oxide) hydroxides, or also reinforcing titanium oxides, for example described in U.S. Pat. Nos. 6,610,261 and 6,747,087, are also suitable as reinforcing inorganic fillers.

The physical state in which the reinforcing inorganic filler is provided is not important, whether it is in the form of a powder, of microbeads, of granules, of beads or any other appropriate densified form. Of course, "reinforcing inorganic filler" is also understood to mean mixtures of different reinforcing inorganic fillers, in particular of highly dispersible siliceous and/or aluminous fillers.

Those skilled in the art will understand that use might be made, as filler equivalent to the reinforcing inorganic filler described in the present section, of a reinforcing filler of another nature, in particular organic nature, such as carbon black, provided that this reinforcing filler is covered with an inorganic layer, such as silica, or else includes, at its surface, functional sites, especially hydroxyl sites, requiring the use of a coupling agent in order to establish the bond between the filler and the elastomer.

In order to couple the reinforcing inorganic filler to the diene elastomer, use is made, in a well-known way, of an at least bifunctional coupling agent (or bonding agent) intended to provide a satisfactory connection, of chemical and/or physical nature, between the inorganic filler (surface of its particles) and the diene elastomer. Use is made in particular of organosilanes or polyorganosiloxanes which are at least bifunctional.

Those skilled in the art can find coupling agent examples in the following documents: WO 02/083782, WO 02/30939, WO 02/31041, WO 2007/061550, WO 2006/125532, WO 2006/125533, WO 2006/125534, U.S. Pat. No. 6,849,754, WO 99/09036, WO 2006/023815, WO 2007/098080, WO 2010/072685 and WO 2008/055986.

The content of coupling agent is advantageously less than 12 phr, it being understood that it is generally desirable to use as little as possible of it. Typically, when a reinforcing inorganic filler is present, the content of coupling agent represents from 0.5% to 15% by weight, relative to the amount of inorganic filler. Its content is preferably within a range extending from 0.5 to 12 phr, more preferentially within a range extending from 4 to 8 phr. This content is easily adjusted by those skilled in the art according to the content of inorganic filler used in the composition.

Preferably, the composition according to the invention is devoid of reinforcing inorganic filler. Composition devoid of a compound is understood to mean that the composition does not comprise this compound deliberately introduced into the composition and that this compound, if it is present, is present in the form of traces related, for example, to the process for the manufacture of said composition. For example, the composition devoid of this compound comprises an amount of less than or equal to 0.1 phr and preferably less than or equal to 0.05 phr.

According to the invention, when the reinforcing filler is present, the content of reinforcing filler, preferably the reinforcing filler predominantly, indeed even exclusively, comprising carbon black, can be within a range extending from 20 to 200 phr, preferably from 30 to 150 phr, preferably from 40 to 100 phr, preferably from 50 to 80 phr.

Crosslinking System

The crosslinking system can be any type of system known to those skilled in the art in the field of rubber compositions for tyres. It can in particular be based on sulfur, and/or on peroxide and/or on bismaleimides.

Preferentially, the crosslinking system is based on sulfur; it is then called a vulcanization system. The sulfur can be contributed in any form, in particular in the form of molecular sulfur, or of a sulfur-donating agent. At least one vulcanization accelerator is also preferentially present, and, optionally, also preferentially, use may be made of various known vulcanization activators, such as zinc oxide, stearic acid or equivalent compound, such as stearic acid salts, and salts of transition metals, guanidine derivatives (in particular diphenylguanidine), or also known vulcanization retarders.

The sulfur is used at a preferred content of between 0.5 and 12 phr, in particular between 1 and 10 phr. The vulcanization accelerator is used at a preferential content of between 0.5 and 10 phr, more preferentially of between 0.5 and 5.0 phr.

Use may be made, as accelerator, of any compound capable of acting as accelerator of the vulcanization of diene elastomers in the presence of sulfur, in particular accelerators of the thiazole type, and also their derivatives, or accelerators of sulfenamide, thiuram, dithiocarbamate, dithiophosphate, thiourea and xanthate types. Mention may in particular be made, as examples of such accelerators, of the following compounds: 2-mercaptobenzothiazyl disulfide (abbreviated to MBTS), N-cyclohexyl-2-benzothiazolesulfenamide (CBS), N,N-dicyclohexyl-2-benzothiazolesulfenamide (DCBS), N-(tert-butyl)-2-benzothiazolesulfenamide (TBBS), N-(tert-butyl)-2-benzothiazolesulfenimide (TBSI), tetrabenzylthiuram disulfide (TBZTD), zinc dibenzyldithiocarbamate (ZBEC) and the mixtures of these compounds.

Various Additives

The rubber compositions in accordance with the invention can also comprise all or a portion of the usual additives customarily used in elastomer compositions, such as, for example, pigments, protective agents, such as antiozone waxes, chemical antiozonants or antioxidants, plasticizing agents and anti-fatigue agents.

When the composition according to the invention is a tyre internal layer composition, it is advantageously devoid of antioxidant.

When the composition according to the invention is a tyre internal layer composition, it can be devoid of plasticizing agent or contain less than 5 phr, preferably less than 1 phr, thereof. Alternatively and according to an also preferred embodiment, the composition according to the invention additionally comprises a plasticizing agent. Preferably, this plasticizing agent is a solid hydrocarbon-based resin (or plasticizing resin), an extending oil (or plasticizing oil) or a mixture of the two.

Furthermore, the composition according to the invention can comprise a cobalt salt, in particular in the case where it is used in an internal layer. Thus, preferably, the composition according to the invention comprises a cobalt salt, preferably selected from the group consisting of abietates, acetylacetonates, tallates, naphthenates, resinates and mixtures of these compounds. The content of cobalt salt can, for example, be between 0.1 and 6 phr, for example between 0.3 and 4 phr, for example between 0.5 and 2.5 phr.

Finished or Semi-Finished Rubber Article and Tyre

Another subject of the present invention is a finished or semi-finished rubber article comprising a composition according to the invention.

A subject of the present invention is also a tyre which comprises a composition according to the invention.

It is possible to define, within the tyre, three types of regions:

The radially exterior region in contact with the ambient air, this region being essentially composed of the tread and of the outer sidewall of the tyre. An outer sidewall is an elastomeric layer positioned outside the carcass reinforcement with respect to the internal cavity of the tyre, between the crown and the bead, so as to completely or partially cover the region of the carcass reinforcement extending from the crown to the bead.

The radially interior region in contact with the inflation gas, this region generally being composed of the layer airtight to the inflation gases, sometimes known as interior airtight layer or inner liner.

The internal region of the tyre, that is to say that between the exterior and interior regions. This region includes layers or plies which are referred to here as internal layers of the tyre. These are, for example, carcass plies, tread underlayers, tyre belt plies or any other layer which is not in contact with the ambient air or the inflation gas of the tyre.

The composition defined in the present description is particularly well suited to tyre treads and to tyre internal layers.

According to the invention, the internal layer can be selected from the group consisting of carcass plies, crown plies, bead-wire fillings, crown feet, decoupling layers, edge rubbers, padding rubbers, the tread underlayer and the combinations of these internal layers.

Preferably, the internal layer is selected from the group consisting of carcass plies, crown plies, bead-wire fillings, crown feet, decoupling layers and combinations of these internal layers.

The invention relates in particular to tyres intended to equip motor vehicles of passenger vehicle type, SUVs ("Sport Utility Vehicles"), or two-wheel vehicles (notably motorcycles), or aircraft, or else industrial vehicles selected from vans, heavy-duty vehicles, i.e. underground trains, buses, heavy road transport vehicles (lorries, tractors, trailers) or off-road vehicles, such as heavy agricultural vehicles or construction vehicles, and the like.

The invention relates to articles comprising a rubber composition according to the invention, both in the raw state (that is to say, before curing) and in the cured state (that is to say, after crosslinking or vulcanization).

Preparation of the Rubber Compositions

The rubber composition in accordance with the invention can be manufactured in appropriate mixers using two successive preparation phases well known to those skilled in the art:

a first phase of thermomechanical working or kneading ("non-productive" phase), which can be carried out in a single thermomechanical step during which all the necessary constituents, in particular the elastomeric matrix, the fillers and the optional other various additives, with the exception of the crosslinking system, are introduced into an appropriate mixer, such as a standard internal mixer (for example of 'Banbury' type). The incorporation of the filler in the elastomer can be carried out in one or more goes by thermomechanically kneading. In the case where the filler is already incorporated, in all or in part, in the elastomer in the form of a masterbatch, as is described, for example, in Applications WO 97/36724 and WO 99/16600, it is the masterbatch which is directly kneaded and, if appropriate, the other elastomers or fillers present in the composition which are not in the masterbatch form, and also the optional other various additives other than the crosslinking system, are incorporated.

The non-productive phase is carried out at high temperature, up to a maximum temperature of between 110° C. and 190° C., preferably between 130° C. and 180° C., for a period of time generally of between 2 and 10 minutes.

a second phase of mechanical working ("productive" phase), which is carried out in an external mixer, such as an open mill, after cooling the mixture obtained during the first non-productive phase down to a lower temperature, typically of less than 110° C., for example between 40° C. and 100° C. The crosslinking system is then incorporated and the combined mixture is then mixed for a few minutes, for example between 2 and 15 min.

The process for preparing such compositions comprises, for example, the following steps:

a) incorporating a reinforcing filler in a diene elastomer during a first step (termed "non-productive" step), everything being kneaded thermomechanically (for example, in one or more goes), until a maximum temperature of between 110° C. and 190° C. is reached;

b) cooling the combined mixture to a temperature of less than 100° C.;

c) subsequently incorporating, during a second step (termed "productive" step), a crosslinking system;

d) kneading everything up to a maximum temperature of less than 110° C.

Between 1 and 30 phr of the epoxy resin and between 0.5 and 15 phr of an aminobenzoate derivative of formula (I) can be introduced, independently of one another, either during the non-productive phase (a) or during the productive phase (c). Preferably, the epoxy resin is introduced during the non-productive phase (a) and the aminobenzoate derivative is introduced during the productive phase (c).

The final composition thus obtained can then be calendered, for example in the form of a sheet, of a plate in particular for characterization in the laboratory, or else extruded in the form of a semi-finished (or profiled) element of rubber used for the manufacture of a tyre.

The composition can be either in the raw state (before crosslinking or vulcanization) or in the cured state (after crosslinking or vulcanization), can be a semi-finished product which can be used in a tyre.

EXAMPLES

Measurements and Tests Used

Scorch Time

The measurements are carried out at 130° C. or 115° C., in accordance with French Standard NF T 43-005. The change in the consistometric index as a function of time makes it possible to determine the scorch time of the rubber compositions, which is assessed in accordance with the abovementioned standard by the parameter T5 (case of a large rotor), expressed in minutes, and defined as being the time necessary to obtain an increase in the consistometric index (expressed in MU) of 5 units above the minimum value measured for this index.

It should be remembered that, in a way well known to those skilled in the art, the longer the scorch time, the more the crosslinking of the material will be delayed before curing.

Mooney Plasticity

Use is made of an oscillating consistometer as described in French Standard NF T 43-005 (1991). The Mooney plasticity measurement is carried out according to the following principle: the composition in the raw state (i.e., before curing) is moulded in a cylindrical chamber heated to 100° C. After preheating for one minute, the rotor rotates within the test specimen at 2 revolutions/minute and the working torque for maintaining this movement is measured after rotating for 4 minutes. The Mooney plasticity (ML 1+4) is expressed in "Mooney unit" (MU, with 1 MU=0.83 newton.metre).

It should be remembered that, in a way well known to those skilled in the art, the lower the Mooney plasticity, the easier the material is to work. Of course, beyond a certain value (e.g., 20 MU), the material becomes too liquid to be usable, in particular for manufacturing internal layers.

Dynamic Properties

The dynamic properties G*(2%) are measured on a viscosity analyser (Metravib VA4000) according to Standard ASTM D 5992-96. The response of a sample of vulcanized composition (cylindrical test specimen with a thickness of 4 mm and a cross-section of 400 mm$^2$), subjected to a simple alternating sinusoidal shear stress, at a frequency of 10 Hz, under standard temperature conditions (23° C.) according to Standard ASTM D 1349-99 or, as the case may be, at a different temperature, is recorded. A strain amplitude sweep is carried out from 0.1% to 50% (outward cycle) and then from 50% to 1% (return cycle). The results made use of are the complex dynamic shear modulus G*. For the return cycle, the complex dynamic shear modulus G*(2%) at 2% strain, at 40° C., is shown.

It should be remembered that the value of G* (2%) return at 40° C. is representative of the stiffness of the material: the greater G* (2%) at 40° C. is, the stiffer the material.

Preparation of the Compositions

The tests which follow are carried out in the following way: the diene elastomer, the reinforcing filler, between 1 and 30 phr of the epoxy resin, and also the various other ingredients, with the exception of the vulcanization system, are successively introduced into an internal mixer (final degree of filling: approximately 70% by volume), the initial vessel temperature of which is approximately 60° C. Thermomechanical working (non-productive phase) is then carried out in one step, which lasts in total approximately from 3 to 4 min, until a maximum "dropping" temperature of 165° C. is reached.

The mixture thus obtained is recovered and cooled and then sulfur, an accelerator of sulfenamide type and the hardener are incorporated on a mixer (homofinisher) at 30° C., everything being mixed (productive phase) for an appropriate time (for example between 5 and 12 min).

The compositions thus obtained are subsequently calendered, either in the form of slabs (thickness from 2 to 3 mm) or of thin sheets of rubber, for the measurement of their physical or mechanical properties, or extruded in the form of a profiled element.

Tests on Rubber Compositions

Six rubber compositions were prepared as indicated above, five not in accordance with the invention (hereinafter denoted C.1 to C.5) and one in accordance (C.6). Their formulations (in phr) and their properties have been summarized in Table 1 below.

With the exception of the control composition C.1, the compositions presented in this Table 1 do not result in the formation of formaldehyde during the curing.

The compositions C.2 to C.6 contain an epoxy resin and a polyamine-comprising hardener as replacement for the phenol/formaldehyde resin/HMT hardener(s) pair present in the conventional control composition C.1.

The results, based on the scorch time and on G*(2%), are presented 100 with respect to the control composition C.1. The Mooney plasticity results are presented in absolute value.

TABLE 1

| Constituent | C.1 | C.2 | C.3 | C.4 | C.5 | C.6 |
| --- | --- | --- | --- | --- | --- | --- |
| NR (1) | 100 | 100 | 100 | 100 | 100 | 100 |
| Carbon black (2) | 70 | 70 | 70 | 70 | 70 | 70 |
| ZnO (3) | 3 | 3 | 3 | 3 | 3 | 3 |
| 6PPD (4) | 2.5 | 2.5 | 2.5 | 2.5 | 2.5 | 2.5 |
| Stearic acid (5) | 2 | 2 | 2 | 2 | 2 | 2 |
| Sulfur | 3 | 3 | 3 | 3 | 3 | 3 |
| CBS (6) | 2 | 2 | 2 | 2 | 2 | 2 |
| Phenol/formaldehyde resin (7) | 12 | — | — | — | — | — |
| HMT (8) | 4 | — | — | — | — | — |
| Epoxy resin (9) | — | 12 | 12 | 12 | 12 | 12 |
| Control hardener (10) | — | 4 | — | — | — | — |
| Control hardener (11) | — | — | 4 | — | — | — |
| Control hardener (12) | — | — | — | 4 | — | — |
| Control hardener (13) | — | — | — | — | 4 | — |
| Hardener (14) | — | — | — | — | — | 4 |
| Scorch time | 100 | 51 | 145 | 125 | 152 | 135 |
| Mooney plasticity (MU) | 46 | 77 | 62 | 31 | 38 | 43 |
| G*(2%) return at 40° C. | 100 | 109 | 101 | 98 | 86 | 113 |

(1) Natural Rubber;
(2) Carbon black N326 (name according to Standard ASTM D-1765)
(3) Zinc oxide (Industrial grade - Umicore)
(4) N-(1,3-Dimethylbutyl)-N-phenyl-para-phenylenediamine (Santoflex 6-PPD from Flexsys)
(5) Stearin (Pristerene 4931 from Uniqema)
(6) N-Cyclohexylbenzothiazolesulfenamide (Santocure CBS from Flexsys)
(7) Phenol/formaldehyde novolac resin (Peracit 4536K from Perstorp)
(8) Hexamethylenetetramine (from Degussa)
(9) Epoxy resin (DEN 439 from Uniqema)
(10) 1,3-Bis(aminomethyl)cyclohexane (from Sigma-Aldrich)
(11) meta-Phenylenediamine from Sigma-Aldrich
(12) Lonzacure MDEA from Lonza
(13) Lonzacure MCDEA from Lonza
(14) trimethylene bis(4-aminobenzoate) (Versalink 740 M from Air Product)

It is noted that the use of an epoxy resin and of an aminobenzoate derivative corresponding to formula (I) in composition C.6 in accordance with the present invention makes it possible to obtain improved Mooney plasticity and an extended scorch time relative to the phenol/formaldehyde resin/HMT hardener(s) pair of the control composition C.1.

The composition C.6 in accordance with the invention exhibits improved stiffness without degrading the properties in the raw state (Mooney plasticity and scorch time), showing that the use of an aminobenzoate derivative corresponding to formula (I) in the compositions of the invention makes it possible to obtain rubber compositions of which the processability/stiffness compromise is much greater than that of a conventional composition, or of compositions comprising other amine-comprising hardeners, not in accordance with the present invention.

This test illustrates rubber compositions which can be used especially in internal mixtures, such as carcass plies, crown plies, bead-wire fillings, crown feet, decoupling layers or the tread underlayer, in particular in carcass plies, crown plies, bead-wire fillings, crown feet, decoupling layers or the tread underlayer, regions requiring a high stiffness with low strain.

The invention claimed is:

1. A rubber composition based on at least:
    a diene elastomer;
    a reinforcing filler;
    a crosslinking system;
    from 10 to 25 parts by weight, per hundred parts by weight of elastomer, phr, of an epoxy resin; and
    from 1 to 10 phr of an aminobenzoate derivative corresponding to formula (I):

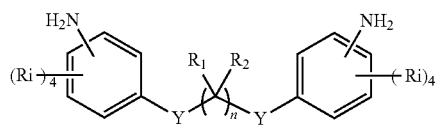

(I)

in which:
    n represents an integer ranging from 1 to 5,
    Y represents an ester function,
    $R_1$ and $R_2$, which may be identical or different, are selected from the group consisting of a hydrogen atom and methyl, ethyl, propyl, butyl, isopropyl, isobutyl, tert-butyl and benzyl groups, and
    the Ri groups, which may be identical or different, are selected from the group consisting of a hydrogen atom, linear $C_1$-$C_6$ alkyl radicals, and branched $C_1$-$C_6$ alkyl radicals,
    wherein the rubber composition does not comprise an amine-comprising hardener other than the aminobenzoate derivative.

2. The rubber composition according to claim 1, wherein the aminobenzoate derivative corresponds to formula (II) or (III):

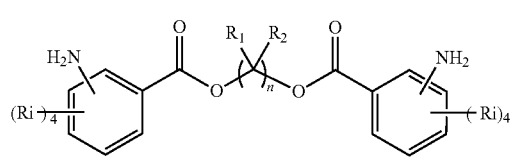

(II)

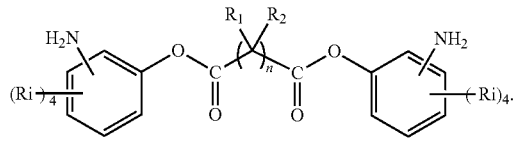

(III)

3. The rubber composition according to claim 1, wherein the aminobenzoate derivative corresponds to formula (IV):

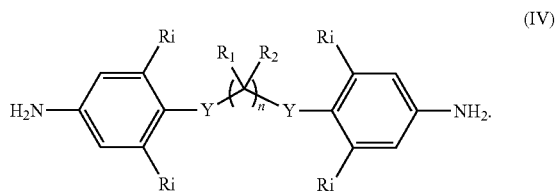

(IV)

4. The rubber composition according to claim 1, wherein the aminobenzoate derivative corresponds to the formula (V) or (VI):

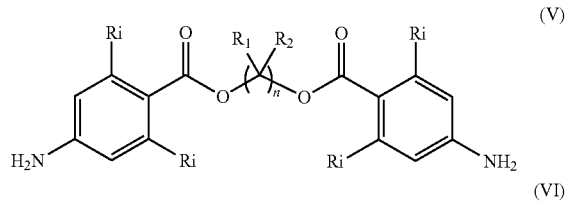

(V)

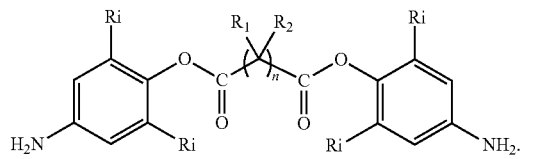

(VI)

5. The rubber composition according to claim 1, wherein the linear $C_1$-$C_6$ alkyl radicals and branched $C_1$-$C_6$ alkyl radicals of the Ri groups are, independently of one another, selected from the group consisting of methyl, ethyl, propyl, isopropyl, isobutyl and butyl radicals.

6. The rubber composition according to claim 1, wherein all of the Ri groups are hydrogen atoms.

7. The rubber composition according to claim 1, wherein n represents an integer ranging from 2 to 4.

8. The rubber composition according to claim 1, wherein $R_1$ and $R_2$, which may be identical or different, are selected from the group consisting of a hydrogen atom, a methyl group and an ethyl group.

9. The rubber composition according to claim 1, wherein $R_1$ and $R_2$ are hydrogen atoms.

10. The rubber composition according to claim 1, wherein the epoxy resin is selected from the group consisting of aromatic epoxy resins, alicyclic epoxy resins, and aliphatic epoxy resins.

11. The rubber composition according to claim 10, wherein the epoxy resin is selected from epoxy cresol novolac resins.

12. A finished or semi-finished rubber article comprising the rubber composition according to claim 1.

13. A tire comprising the rubber composition according to claim 1.

14. A tire comprising the semi-finished rubber article according to claim 12.

* * * * *